US011753168B2

(12) United States Patent
Ozaki et al.

(10) Patent No.: US 11,753,168 B2
(45) Date of Patent: Sep. 12, 2023

(54) SEAT UNIT AND LOWER STRUCTURE THEREOF

(71) Applicant: JAMCO CORPORATION, Mitaka (JP)

(72) Inventors: Masaji Ozaki, Mitaka (JP); Michihito Suzuki, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 307 days.

(21) Appl. No.: 16/498,528

(22) PCT Filed: Dec. 18, 2017

(86) PCT No.: PCT/JP2017/045274
§ 371 (c)(1),
(2) Date: Sep. 27, 2019

(87) PCT Pub. No.: WO2018/185978
PCT Pub. Date: Oct. 11, 2018

(65) Prior Publication Data
US 2021/0107657 A1     Apr. 15, 2021

(30) Foreign Application Priority Data

Apr. 3, 2017 (JP) ................................. 2017-073603

(51) Int. Cl.
B64D 11/06 (2006.01)
(52) U.S. Cl.
CPC ...... B64D 11/0627 (2014.12); B64D 11/0605 (2014.12); B64D 11/0606 (2014.12); B64D 11/0696 (2013.01)
(58) Field of Classification Search
CPC . B64D 11/06; B64D 11/0606; B64D 11/0627; B64D 11/0636; B64D 11/0648;
(Continued)

(56) References Cited

U.S. PATENT DOCUMENTS 3,186,674 A * 6/1965 Maurice .................. B63B 29/04
248/632
4,410,215 A * 10/1983 McKean ................ A47C 7/626
297/423.19
(Continued)

FOREIGN PATENT DOCUMENTS

EP    2 848 461 A1    3/2015
FR    2 972 974 A1    9/2012
(Continued)

OTHER PUBLICATIONS

International Search Report (Form PCT/ISA/210) dated Mar. 20, 2018, issued in counterpart International Application No. PCT/JP2017/045274 (2 pages).
(Continued)

*Primary Examiner* — Christopher D Hutchens
*Assistant Examiner* — Michael A. Fabula
(74) *Attorney, Agent, or Firm* — WHDA, LLP

(57) ABSTRACT

A seat unit and a lower structure thereof that are not restricted in their positional relationship with seat tracks provided in advance in the airframe. One representative seat unit of the present invention and the lower structure thereof includes a hollow structure integrally formed using a composite member. The hollow structure is hollow in a front direction of the seat unit. The hollow structure has a quadrilateral shape in the front direction of the seat unit. In addition, a partition plate is disposed in the hollow structure. Furthermore, the lower structure includes attachment points to an aircraft at three locations on its bottom. In addition, a block is embedded in the composite member at the attachment point, and a thickness of the composite member around a bracket coupled to the block is less than thickness at other locations.

10 Claims, 12 Drawing Sheets

(58) Field of Classification Search
CPC ......... B64D 11/0696; A47C 3/12; A47C 5/12; B60N 2/68; B60N 2/686; B60N 2/01558; B60N 2/005; B60R 7/043; B29L 2031/771
See application file for complete search history.

(56) References Cited

U.S. PATENT DOCUMENTS

| | | | | |
|---|---|---|---|---|
| 4,799,632 | A * | 1/1989 | Baymak | B64D 11/0691 244/122 R |
| 4,854,261 | A * | 8/1989 | Goldsmith | B63B 29/04 312/50 |
| 5,624,160 | A * | 4/1997 | Koch | B64D 11/0648 297/440.16 |
| 5,667,115 | A * | 9/1997 | Verhaeg | B60R 7/043 224/542 |
| 5,816,650 | A * | 10/1998 | Lucas, Jr. | B60N 2/3045 297/188.1 |
| 5,921,629 | A * | 7/1999 | Koch | B64D 11/06 297/440.16 |
| 7,530,631 | B2 * | 5/2009 | Skelly | B60N 2/646 297/188.08 |
| 7,946,532 | B2 * | 5/2011 | Martin | B64D 11/0646 244/118.6 |
| 8,128,163 | B2 * | 3/2012 | Alberti | B60R 7/043 297/188.08 |
| 9,433,299 | B2 * | 9/2016 | Abelmann | A47C 7/626 |
| 9,688,408 | B2 * | 6/2017 | Klettke | B60N 2/90 |
| 11,235,880 | B2 * | 2/2022 | Ozaki | B64D 11/06 |
| 11,319,076 | B2 * | 5/2022 | Ozaki | B64D 11/0627 |
| 11,325,711 | B2 * | 5/2022 | Ozaki | B64D 11/0601 |
| 2003/0222174 | A1 * | 12/2003 | Saint-Jalmes | B64D 11/06 244/118.1 |
| 2004/0232283 | A1 * | 11/2004 | Ferry | B60N 2/309 244/118.6 |
| 2006/0163917 | A1 * | 7/2006 | Schroeder | B64D 11/06 297/188.1 |
| 2008/0061606 | A1 * | 3/2008 | Skelly | B60N 2/646 297/188.1 |
| 2008/0290715 | A1 | 11/2008 | Fullerton et al. | |
| 2009/0065643 | A1 | 3/2009 | Park | |
| 2010/0045082 | A1 * | 2/2010 | Alberti | B60R 5/003 297/188.08 |
| 2011/0101165 | A1 | 5/2011 | Fullerton et al. | |
| 2011/0108666 | A1 | 5/2011 | Pozzi et al. | |
| 2012/0138744 | A1 | 6/2012 | Fullerton et al. | |
| 2014/0197271 | A1 | 7/2014 | Maloney et al. | |
| 2015/0130254 | A1 | 5/2015 | Yamaguchi et al. | |
| 2015/0175266 | A1 * | 6/2015 | Ferry | B64D 11/06 244/118.6 |
| 2016/0009398 | A1 * | 1/2016 | Klettke | B60N 2/90 297/183.6 |
| 2018/0148176 | A1 * | 5/2018 | Rodriguez | B64D 11/00153 |
| 2021/0101685 | A1 * | 4/2021 | Ozaki | B64D 11/06 |
| 2021/0114735 | A1 * | 4/2021 | Ozaki | B64D 11/0696 |
| 2021/0129994 | A1 * | 5/2021 | Ozaki | B64D 11/0606 |

FOREIGN PATENT DOCUMENTS

| | | |
|---|---|---|
| JP | 58-173355 U | 11/1983 |
| JP | 2008-521703 A | 6/2008 |
| JP | 2010-527835 A | 8/2010 |
| WO | 2006/059118 A1 | 6/2006 |
| WO | 2012/169906 A1 | 12/2012 |
| WO | 2013-168769 A1 | 11/2013 |

OTHER PUBLICATIONS

Extended European Search Report dated Nov. 12, 2020, issued in counterpart EP Patent Application No. 17904458.1 (13 pages).
English Translation of Written Opinion (Form PCT/ISA/237) of the International Searching Authority dated Mar. 20, 2018, issued in Counterpart International Application No. PCT/JP2017/045274 (7 pages).

* cited by examiner

SEAT UNIT AND LOWER STRUCTURE THEREOF

TECHNICAL FIELD

The present invention relates to a seat unit and the lower structure thereof.

BACKGROUND ART

In recent years, the importance of weight reduction is increasing in aircraft design. If weight reduction of aircraft structures can be achieved, the amount of fuel that can be loaded in aircraft can be increased accordingly, and the flight range can be extended. Furthermore, if weight reduction of aircraft structures can be achieved, the number of passengers that can be carried by aircraft can be increased accordingly, and the potential profitability of the aircraft can be increased.

In Patent Document 1, there is described a seat assembly comprising an integral composite frame and a comfort frame assembly provided for each passenger that is connected to the composite frame. By using an integrated composite frame, the passenger seat can be formed to be compact and lightweight with a small number of parts. Furthermore, this passenger seat can achieve the safety structural specifications required for aircraft seats.

This seat assembly is mounted to the seat track. The seat track is the mounting interface between the seat assembly and the airframe structure of the aircraft, and is provided in advance along the longitudinal direction of the airframe.

CITATION LIST

Patent Literature

[Patent Document 1] Japanese Translation of PCT International Application Publication No. 2010-527835

SUMMARY OF INVENTION

Technical Problem

The seat assembly described in Patent Document 1 is connected to a seat track provided in advance on the airframe of the aircraft by support legs of the seat assembly. For this reason, the arrangement of the seat assembly is limited by its positional relationship with the seat track provided on the airframe. In the case of a three-person seat assembly, for example, both legs of the seat assembly for the center passenger need to be disposed directly above the seat track, which restricts the seating arrangement, and the support legs of the front seat are arranged at a position that is uncomfortable for the passenger.

Accordingly, an object of the present invention is to provide a seat unit and a lower structure thereof that are not restricted in their positional relationship with the seat track provided in advance on the airframe.

Solution to Problem

In order to achieve the above-described object, one representative seat unit of the present invention and the lower structure thereof includes a hollow structure integrally formed using a composite member.

Advantageous Effects of Invention

According to the present invention, it is possible to arrange a seat without being restricted by its positional relationship with the seat track.

DESCRIPTION OF EMBODIMENT(S)

Figure 1:
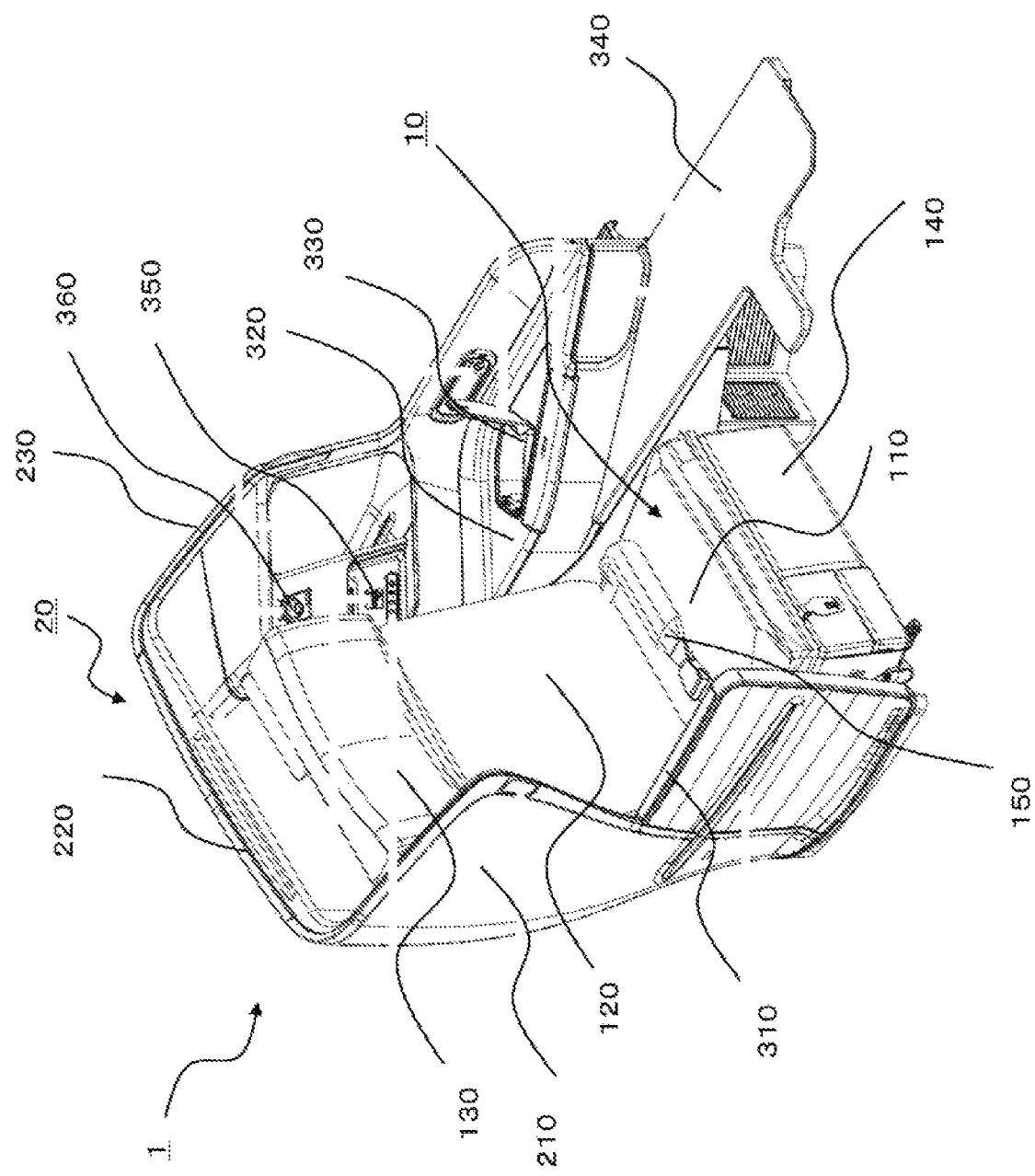
FIG. 1 is a front perspective view of a general seat unit.

First, a general seat unit will be described. FIG. 1 is a perspective view from the forward direction of a seat unit for business class or first class that is disposed in the cabin of an aircraft. The seat unit 1 has a structure in which the seat 10 is surrounded by a shell 20, and in this Figure, equipment used by a passenger (such as a reading light 360) is also depicted.

The seat 10 includes a lower seat 110, an upper seat 120, a headrest 130, and a leg rest 140. The lower seat 110 is also referred to as a seating portion, and the upper seat 120 is also referred to as a backrest. A seat belt 150 is attached to the seat.

The shell 20 includes a right side shell 210 on the right side of the seat 10, a rear side shell 220 on the rear side of the seat 10, and a left side shell 230 on the left side of the seat 10.

The seat unit 1 further includes various equipment. On the right side of the seat 10, a right armrest portion 310 is provided. On the left side of the seat 10, a left armrest portion 320 is provided. The left armrest portion 320 is provided with an openable/closable storage box 330. An ottoman 340 is disposed in front of the left armrest portion 320.

Further, between the headrest 130 and the left side shell 230, one or more jacks 350 for electronic devices and a reading light 360 are disposed.

Figure 2:
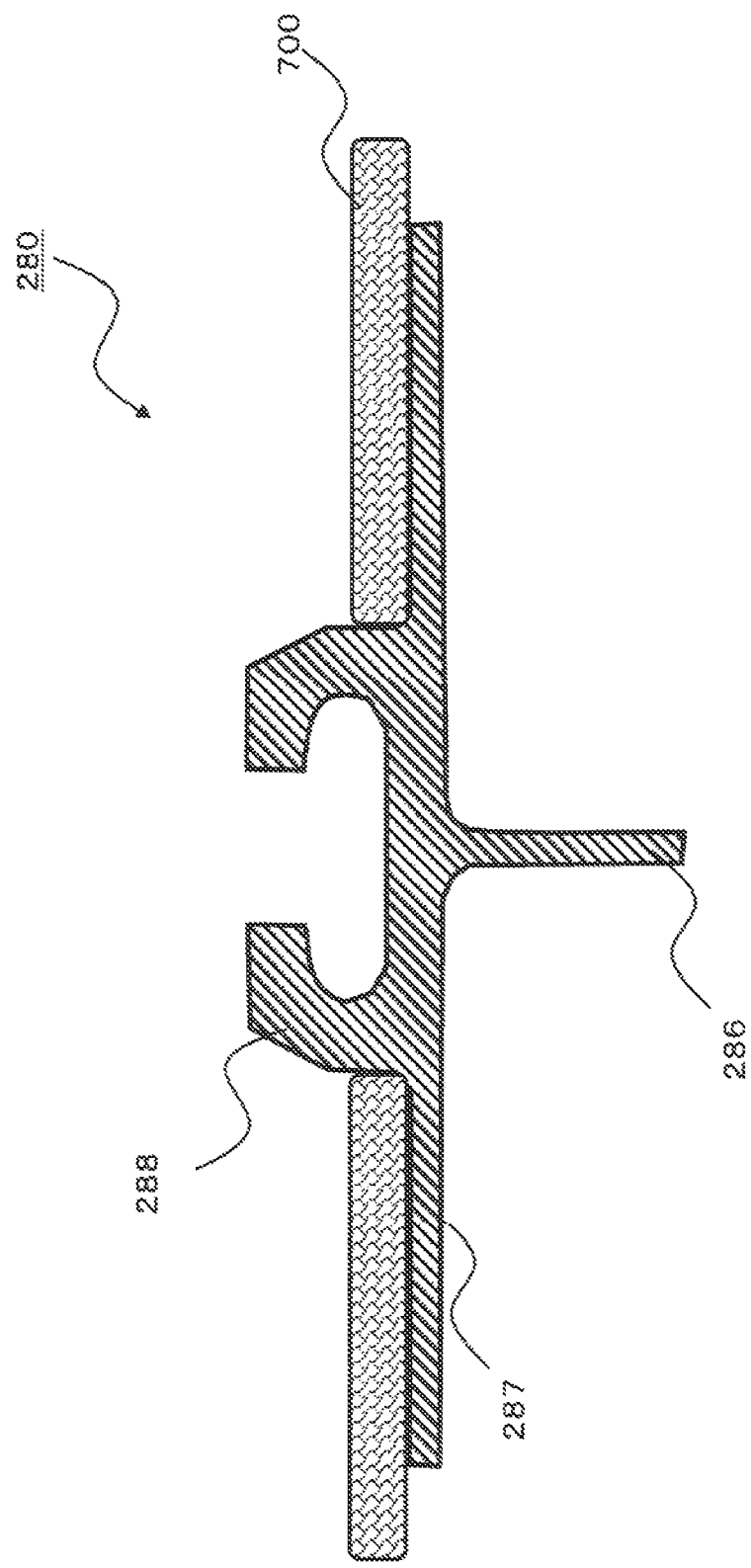
FIG. 2 is a cross-sectional view of a seat track.

On the airframe of the aircraft, a seat track, as illustrated in cross section in FIG. 2, is inserted into the floor 700 of the airframe along the longitudinal direction of the aircraft.

As illustrated in FIG. 2, the seat track 280 includes an underfloor structure 286 that serves as a structural component under the floor 700 of the aircraft airframe, a flat portion 287 that supports the floor plate, and a seat track side fitting portion 288.

Figure 3:
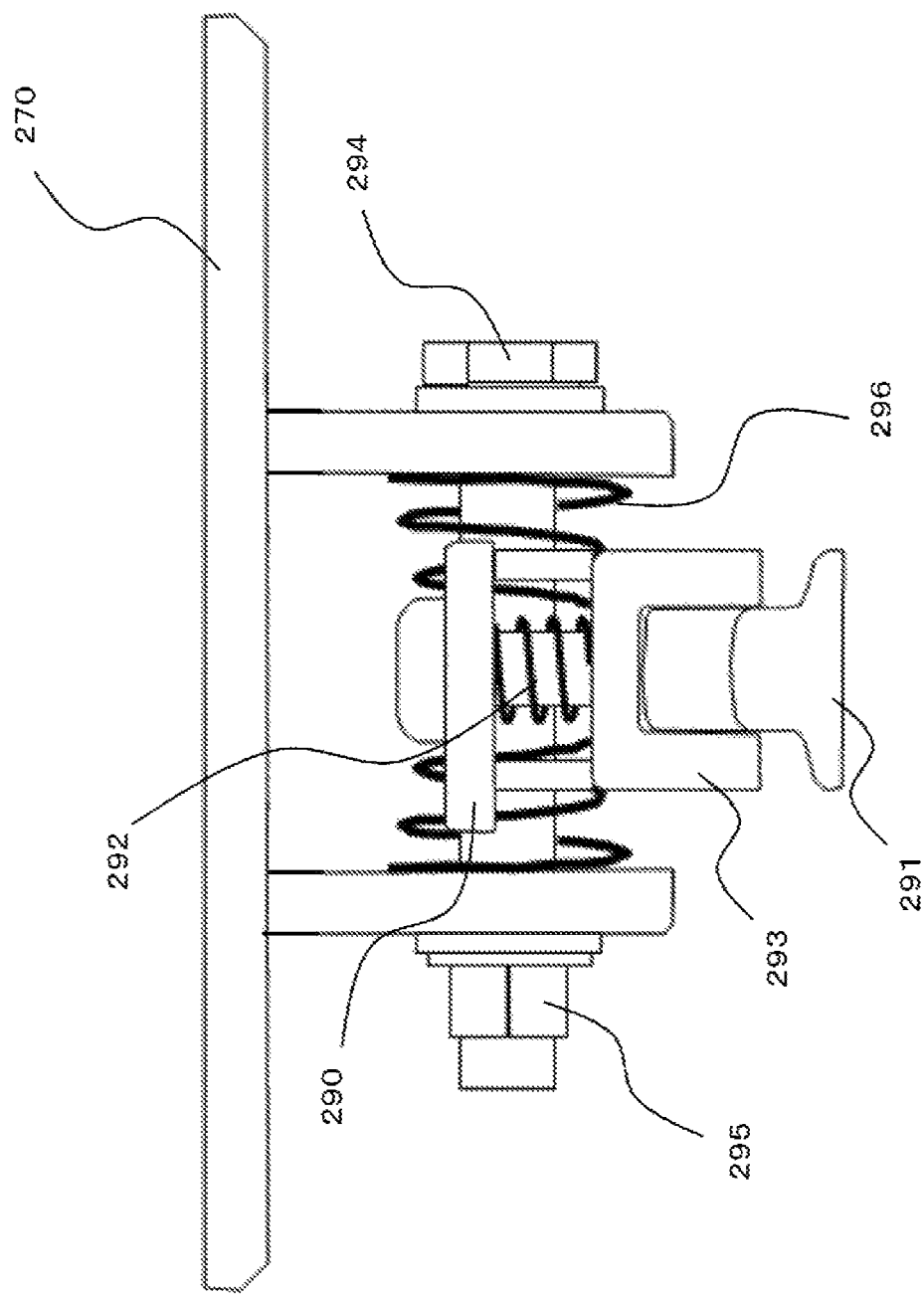
FIG. 3 is an enlarged view around a track fitting member.
Figure 4:
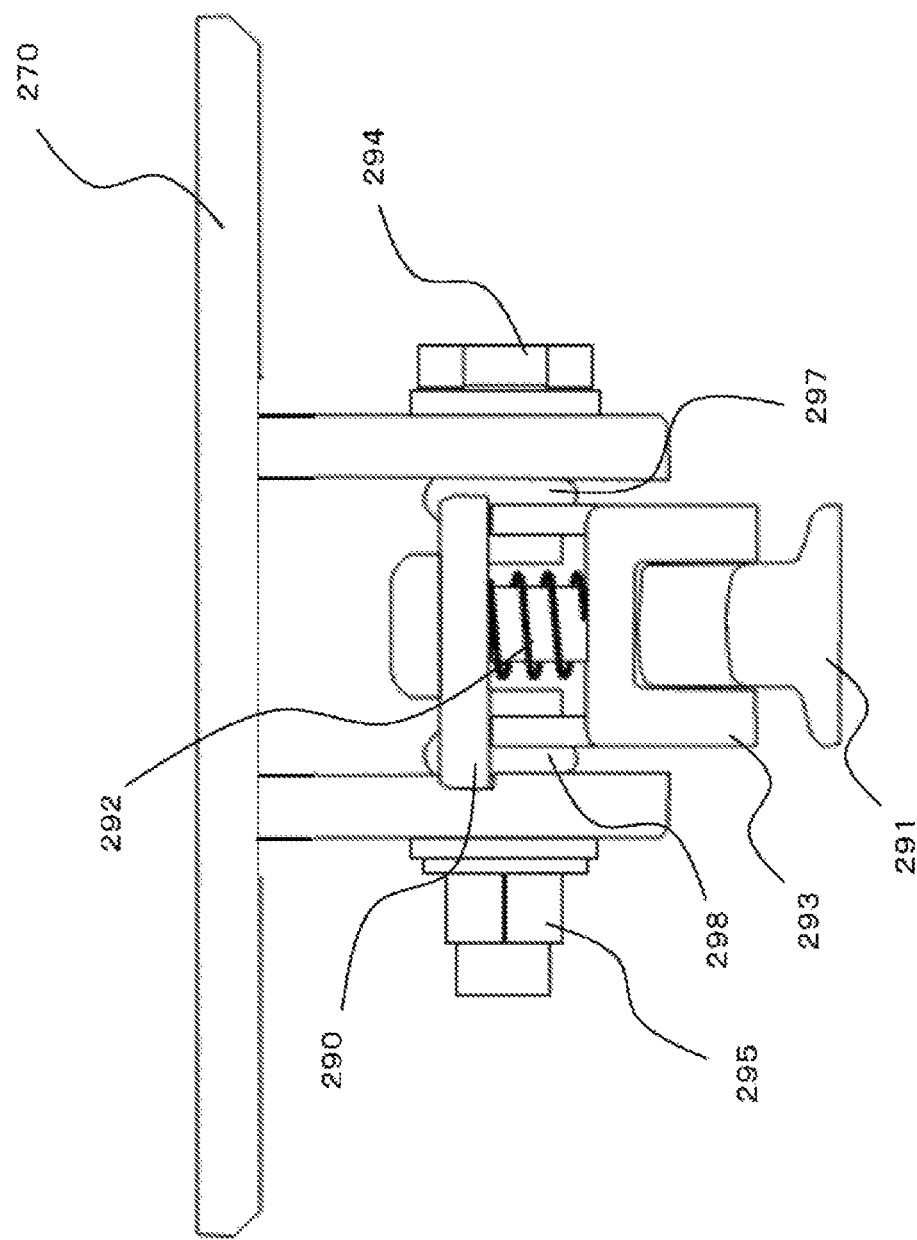
FIG. 4 is an enlarged view around another track fitting member.

In addition, the seat unit is fixed to the seat track by a track fitting member as illustrated in FIG. 3 or FIG. 4. Here, conventionally, four track fitting members would be disposed under the four front, rear, left, and right legs of the seat unit, and be fixed to the two rows of seat tracks.

FIG. 3 is an enlarged view around the track fitting member. The fixture 270, also referred to as a fitting bracket, is fixed to the seat track 280. The fitting side fitting portion 291 is fixed to the fitting portion 288 on the seat track side.

The track fitting member 290 is provided with a bolt 294 and a nut 295 for pressing the plunger 293 downward by a vertical spring 292, assuming the load on the front and rear of the airframe, and fixing the fixture 270. In addition, a lateral spring 296 is provided to prevent shifting when a margin is provided to allow for deviation in the distance between the pair of left and right track fittings.

FIG. 4 is an enlarged view around another track fitting member. The difference from FIG. 3 is that a right side buffer member 297 and a left side buffer member 298 are attached between the track fitting member 290 and the fixture 270 in place of the lateral spring 296. The right side buffer member 297 and the left side buffer member 298 are provided with holes through which the externally threaded portion of the bolt 294 passes.

First Embodiment

Figure 5:
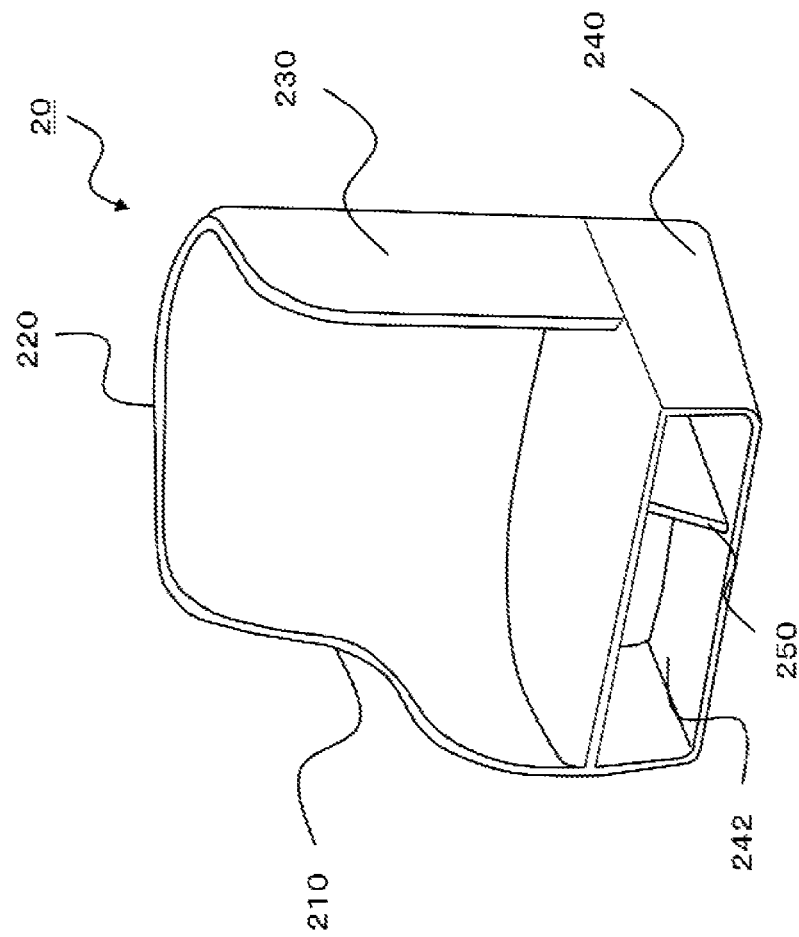
FIG. 5 is a front perspective view of a shell structure that combines a lower structure and an upper shell of a seat unit according to a first embodiment.

FIG. 5 is a perspective view of a shell structure that combines the lower structure and the upper shell of the seat unit according to the first embodiment, as viewed obliquely from the front.
(Configuration)

The shell 20 is configured by adding an upper shell consisting of a right side shell 210, a rear side shell 220, and a left side shell 230 as separate members to a seat base 240 that serves as the lower structure of the seat unit.

The seat base 240, which serves as the lower structure of the seat unit, is formed in a hollow box shape using integrally formed members. Here, specifically, the integrally formed members are members formed from thermoplastic resins such as polyetherimide or polyetherketoneketone, thermosetting resins capable of appropriately controlling flammability, or composite materials such as carbon graphite fiber, glass fiber, or aramid fiber, and are composite members that contain a core material such as foam or honeycomb. Such an integrally formed composite member can form a solid three-dimensional shape without using connection parts such as bolts and nuts. Furthermore, since the integrally formed composite member is formed from the above-described composite materials, the locations that perform anticorrosion processes can be significantly reduced in comparison with the structural members formed from conventional metals.

In addition, the hollow box structure refers to a cylindrical structural shape, which is also known as a monocoque structure. Accordingly, the seat base 240 can support the load of the seat, the passenger, and the equipment used by the passenger (such as the reading light 360).

The hollow region 242 of the seat base 240 is rectangular when viewed from the front of the seat, but may have a quadrilateral shape, such as a trapezoid. In addition, the thickness of the seat base 240, that is, the thickness of the members constituting the lower structure of the seat, are approximately 10 mm to 15 mm.

With such a seat base 240, there is no concept of a column-like support or leg portion for supporting the leg of one seat, the position of which is restricted by the position of the seat track on the airframe side. Accordingly, regardless of the shape of the upper structure of the seat, a common structure can be adopted for seats of various sizes and shapes. In addition, since the installation of electric devices and the arrangement of the wiring associated therewith are not restricted by the position of the leg portion, the degree of freedom and commonality in design can be expanded.

In addition, a partition member 250 can be disposed in the hollow region 242. Since the seat base 240 has a hollow monocoque structure, the partition member 250 (sometimes referred to as a partition) need not support the load of a passenger or the like, and can freely move within the hollow region 242.

Figure 6:
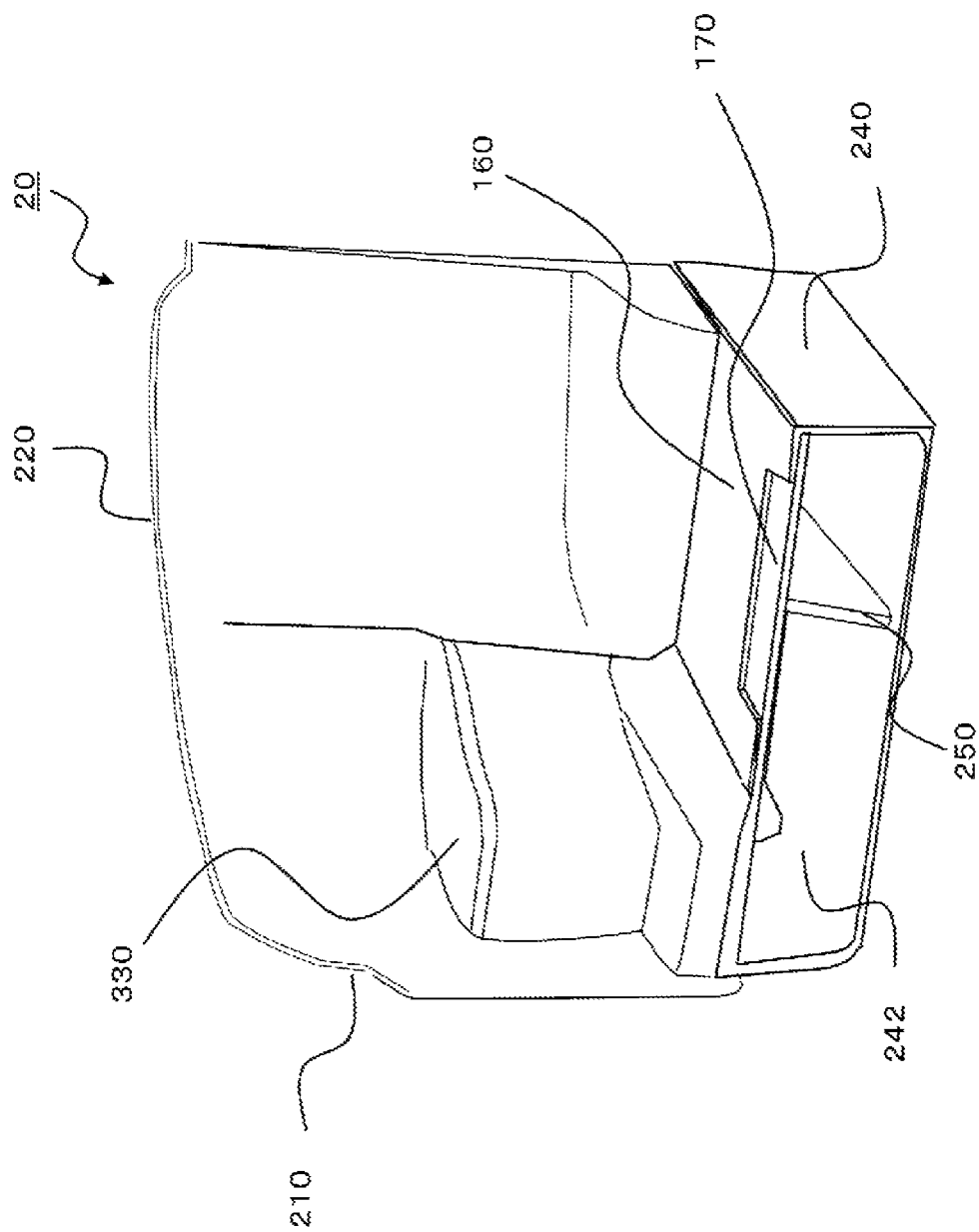
FIG. 6 is a front perspective view of a shell structure according to the first embodiment.

FIG. 6 is a perspective view of the shell structure according to the first embodiment as viewed obliquely from the front, and illustrates a state prior to attachment of the seat 10. An upper seat support structure 160 for supporting the upper seat 120 of the seat 10 is disposed on the seat base 240. In addition, a storage box 330 that serves as both a console and a leg space for the rear seat is disposed to the right of the upper seat support structure 160.

As the seat base 240 itself has a monocoque structure, it has a considerable degree of strength. However, it is also possible to further provide a local reinforcing member 170 on the upper surface of the seat base 240 where the seat 10 is mounted. By adding local reinforcing members 170 to prevent stress concentration of the load from the passenger, the load can be distributed.

Figure 7:
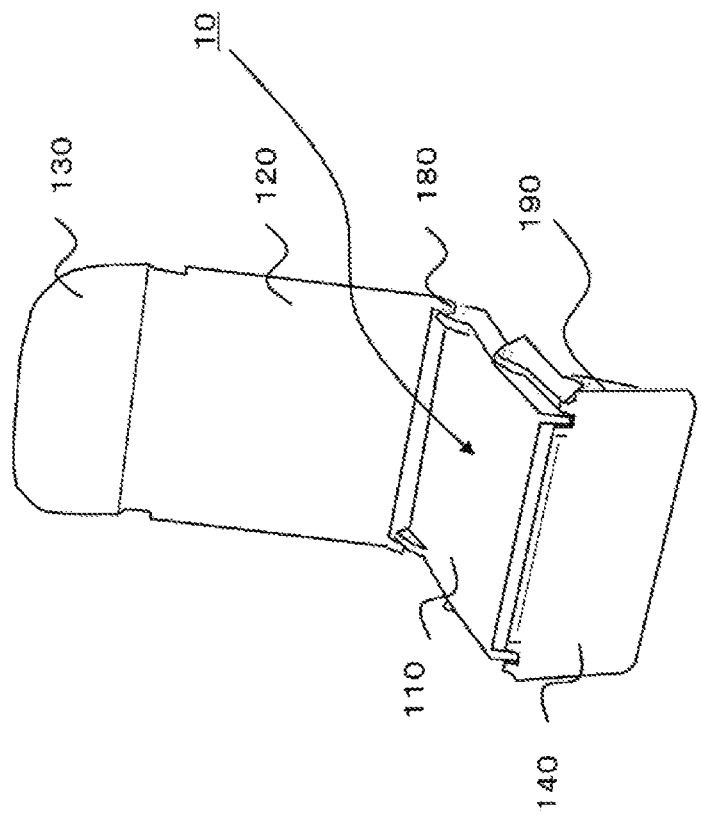
FIG. 7 is a front perspective view of a seat used in the first embodiment.

FIG. 7 is a perspective view of an example of a seat used in the first embodiment as viewed obliquely from the front. The seat 10 includes a lower seat 110 on which a passenger sits, an upper seat 120 to serve as a backrest, a headrest 1130 that is a pillow-like portion on the upper part of the backrest and allows passengers to rest their head and neck, and a leg rest 140 for passengers to rest their legs and reduce fatigue on their calves or the like.

The seat reclining mechanism 180 is a mechanism that tilts the upper seat 120 rearward. The foot reclining mechanism 190 is a mechanism that rotates the leg rest 140 so as to lift it toward the surface of the lower seat 110.

Figure 8:
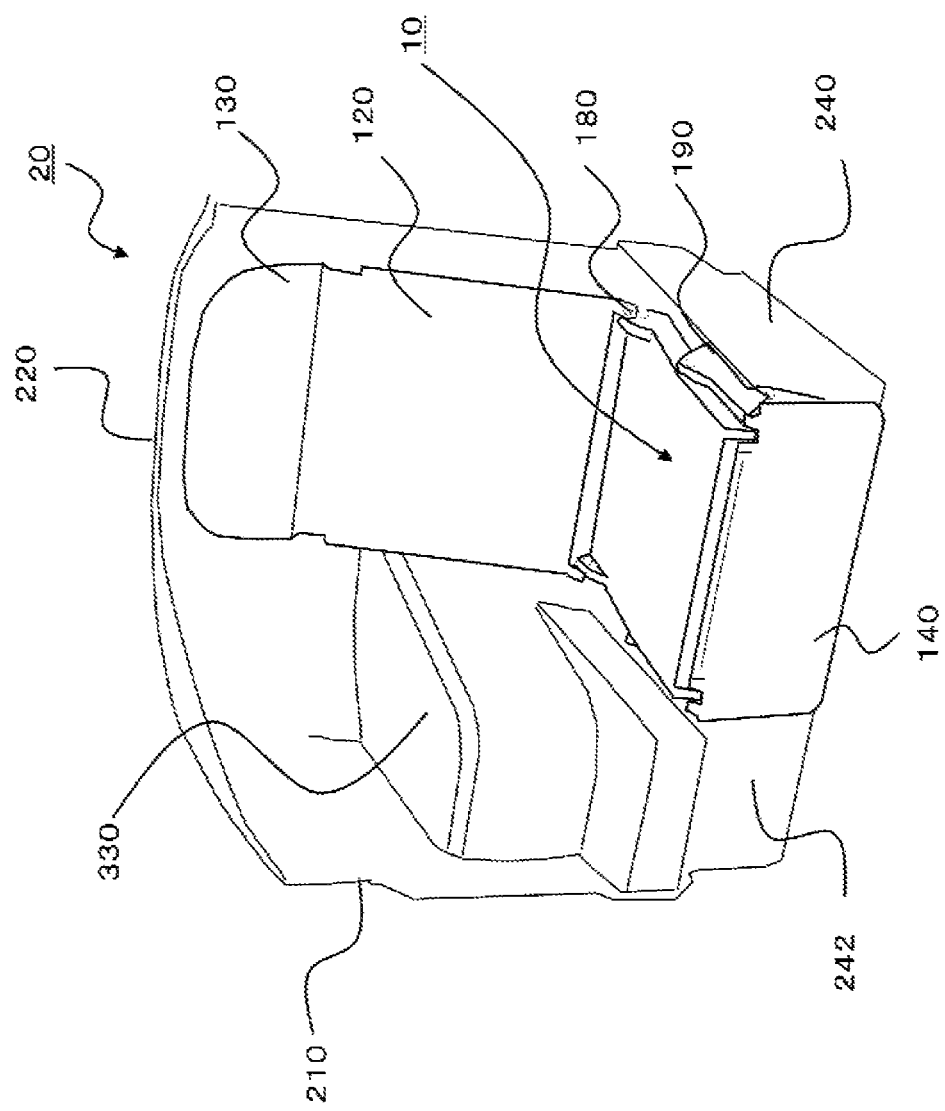
FIG. 8 is a front perspective view of a seat unit according to the first embodiment.

FIG. 8 is a perspective view of the seat unit according to the first embodiment as viewed obliquely from the front. The seat unit 1 has a configuration in which the seat 10 described with reference to FIG. 7 is placed on the shell 20 described with reference to FIG. 6.

Figure 9:
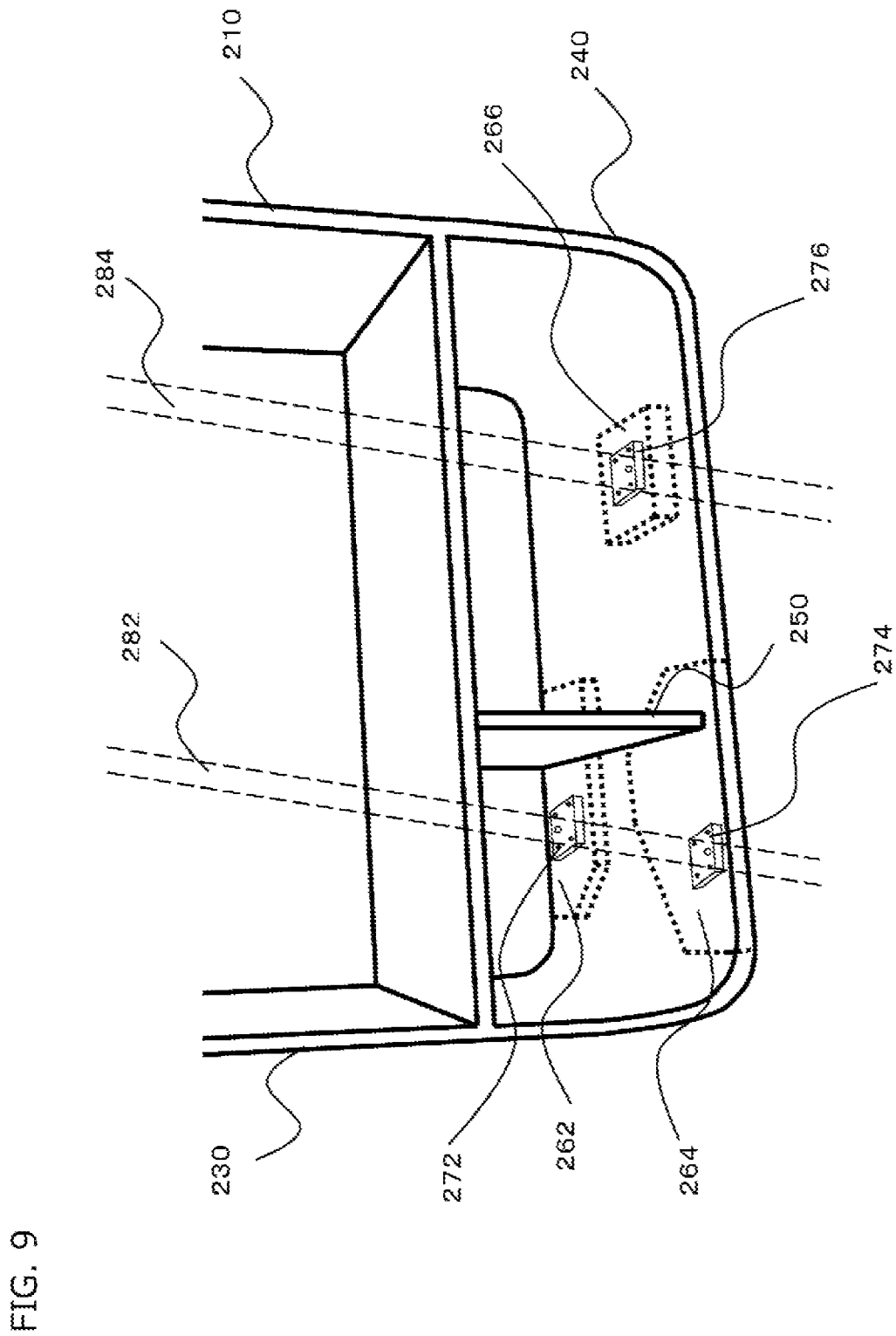
FIG. 9 is a rear perspective view of a seat base according to the first embodiment.

FIG. 9 is a perspective view of a seat base that serves as the lower structure of the seat unit according to the first embodiment, as viewed obliquely from the rear. For convenience of description of the seat track (to be described later), the shell 20 omits the rear side shell 220, while the right side shell 210 and the left side shell 230 are illustrated in the Figures.

The first seat track 282 and the second seat track 284 constitute a pair of seat tracks and extend in the longitudinal direction of the aircraft airframe. In the aircraft, by fixing the bottom of the seat unit 1 (the bottom of the seat base 240 in FIG. 9) to the pair of seat tracks, the seat unit 1 is attached to the aircraft airframe, and it is necessary for this seat unit 1 to pass a predetermined dynamic load test to ensure passenger safety. In FIG. 9, the seat base 240 is disposed slightly leftward with respect to the longitudinal direction of the aircraft airframe. For this reason, the seat base 240 does not squarely face the first seat track 282 and the second seat track 284, but faces slightly to the left.

At the bottom of the seat base 240, three mounting blocks are inserted (the mounting blocks are shown with dotted lines). The seat base 240 is secured to the three fixtures for attachment to the aircraft airframe via the three mounting blocks. Since the seat base 240 is a monocoque structure, mounting blocks are provided at the bottom of the seat base 240 and are used to reinforce the connection between the fixture and the seat base 240. The material of the mounting block is preferably made of metal or the like, but the material is not limited as long as it is a reinforcing block.

In FIG. 9, in order to attach the seat base 240 to the aircraft airframe in three locations, the first mounting block 262 is inserted in front of the bottom of the seat base 240 and the second mounting block 264 is inserted behind it. The third mounting block 266 is inserted on the right side.

Below each mounting block, the fixtures for the seat track are respectively arranged (the fixtures are indicated by solid lines). That is, a first fixture 272 is disposed below the first mounting block 262 and is attached to the first seat track 282. A second fixture 274 is disposed below the second mounting block 264 and is mounted to the first seat track 282 at a point separated from the first fixture 272.

In addition, a third fixture 276 is disposed below the third mounting block 266 and is attached to the second seat track 284 at a corresponding location between the first fixture 272 and the second fixture 274. Preferably, the third fixture 276 is mounted approximately at the center of a corresponding location between the first fixture 272 and the second fixture 274.

In this way, using the three fixtures to secure the seat base 240 to the pair of seat tracks eliminates the need for mounting the seat base 240 at an orientation that squarely faces the seat tracks. This makes it possible to significantly improve the degree of freedom in mounting the seat with respect to deviations of the airframe, as well as the compliance required at the time of seat certification with respect to floor surface deformations.

Figure 10:
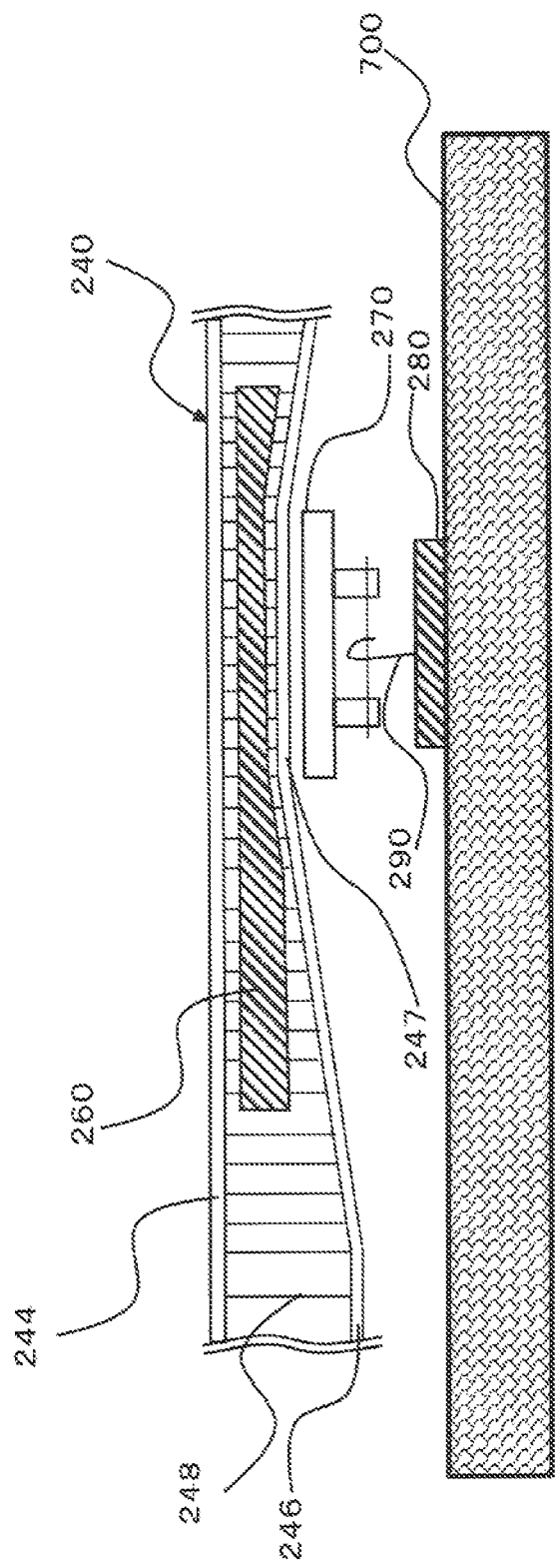
FIG. 10 is an enlarged view around the bottom of a seat base according to the first embodiment.

FIG. 10 is an enlarged view around the bottom of the seat base 240 according to the first embodiment. The bottom of the seat base 240 forms a honeycomb structure 248 between the inner surface 244 on the hollow region 242 side and the opposite outer surface 246. In the honeycomb structure 248, a mounting block 260 is disposed. The mounting block 260 and the fixture 270 are fixed by bolts and nuts or the like. The material of the inner surface 244 and the outer surface 246 is, for example, a composite fiber of resin and fiber. The material of the honeycomb structure 248 is, for example, a composite fiber of noncombustible paper and phenol resin.

The thickness of the mounting block 260 below which the fixture 270 is disposed is reduced. The thickness of the bottom of the seat base 240, below which the fixture 270 is arranged, is similarly reduced. By making the bottom of the seat base 240 and a portion of the mounting block 260 thin in this way and providing the recess 247, the inner surface 44 of the seat base 240 can be kept flat, which is convenient for passengers to place their legs and store luggage in the hollow region 242.

The fixture 270 is secured to the seat track 280 attached to the floor 700 of the aircraft by a track fitting member 290.

(Operational Advantage)

According to the first embodiment, by using a seat base which is an integrally formed hollow box type lower structure, the influence of the position of the seat track on the airframe side can be eliminated, and this has the effect of increasing the degree of freedom in the mounting position of the seat base. Furthermore, regardless of the position of the seat track, a large space can be secured at the feet area, and this has the effect of allowing the passenger to extend his or her legs wherever he or she pleases. In addition, in the case that the airframe manufacturer develops and provides seat bases having a monocoque structure, the seat manufacturer can easily perform the test certification for the seat base, which has the effect of shortening the development period.

Second Embodiment

Figure 11:
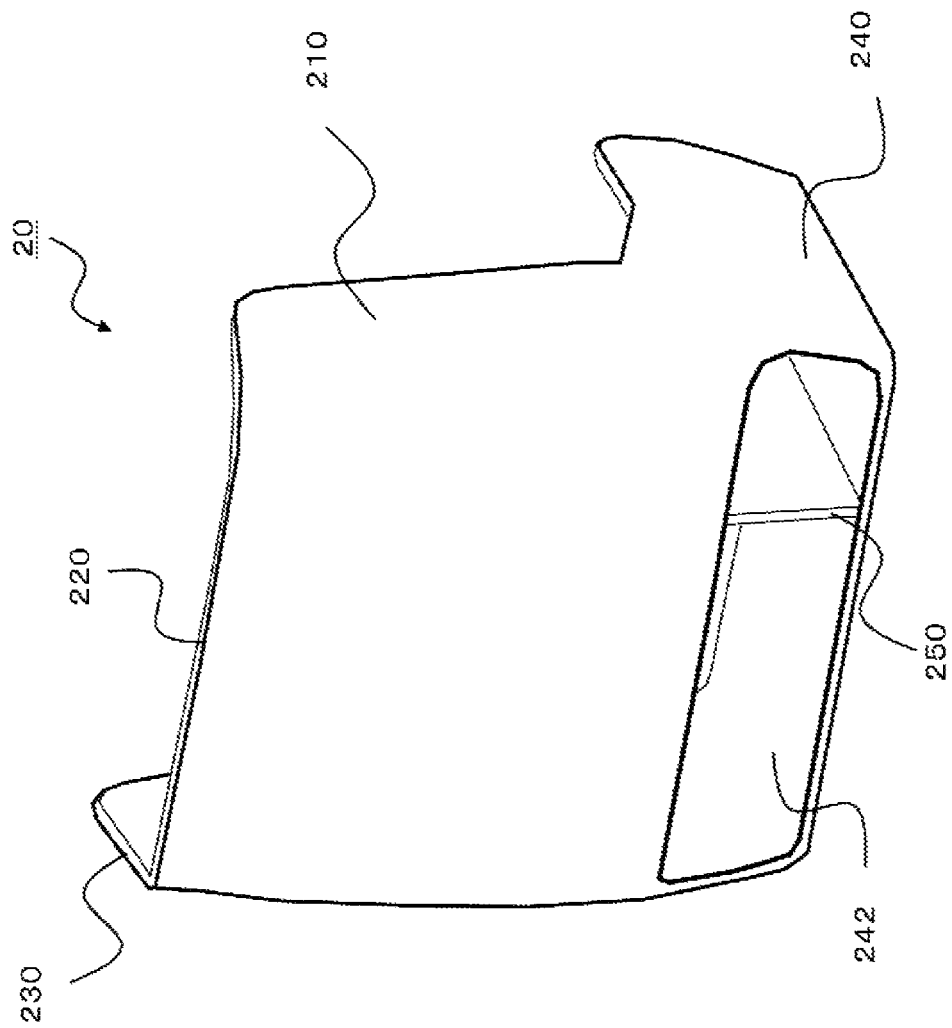
FIG. 11 is a rear perspective view of a shell according to a second embodiment.

Next, a second embodiment will be described with reference to FIG. 11. FIG. 11 illustrates a shell 20 that integrally molds the seat base 240 and the upper shell described in the first embodiment. Except for the fact that the seat base 240 and the upper shell are integrally molded together, the configuration is the same as the first embodiment.

(Configuration)

In the second embodiment, the seat base 240 and the upper shell are integrally molded together to realize an integrated monocoque structure. The composite material and the like used for the integrally molded members are also the same as in the first embodiment.

(Operational Advantage)

According to the second embodiment, the same advantages as those of the first embodiment can be obtained, and further, since the seat base and the upper shell are integrated together, the strength of the entire seat can be increased, and the ease of assembly at the time of production can also be improved. In addition, an advantage of simplifying the mounting operation can also be obtained.

Third Embodiment

Figure 12:
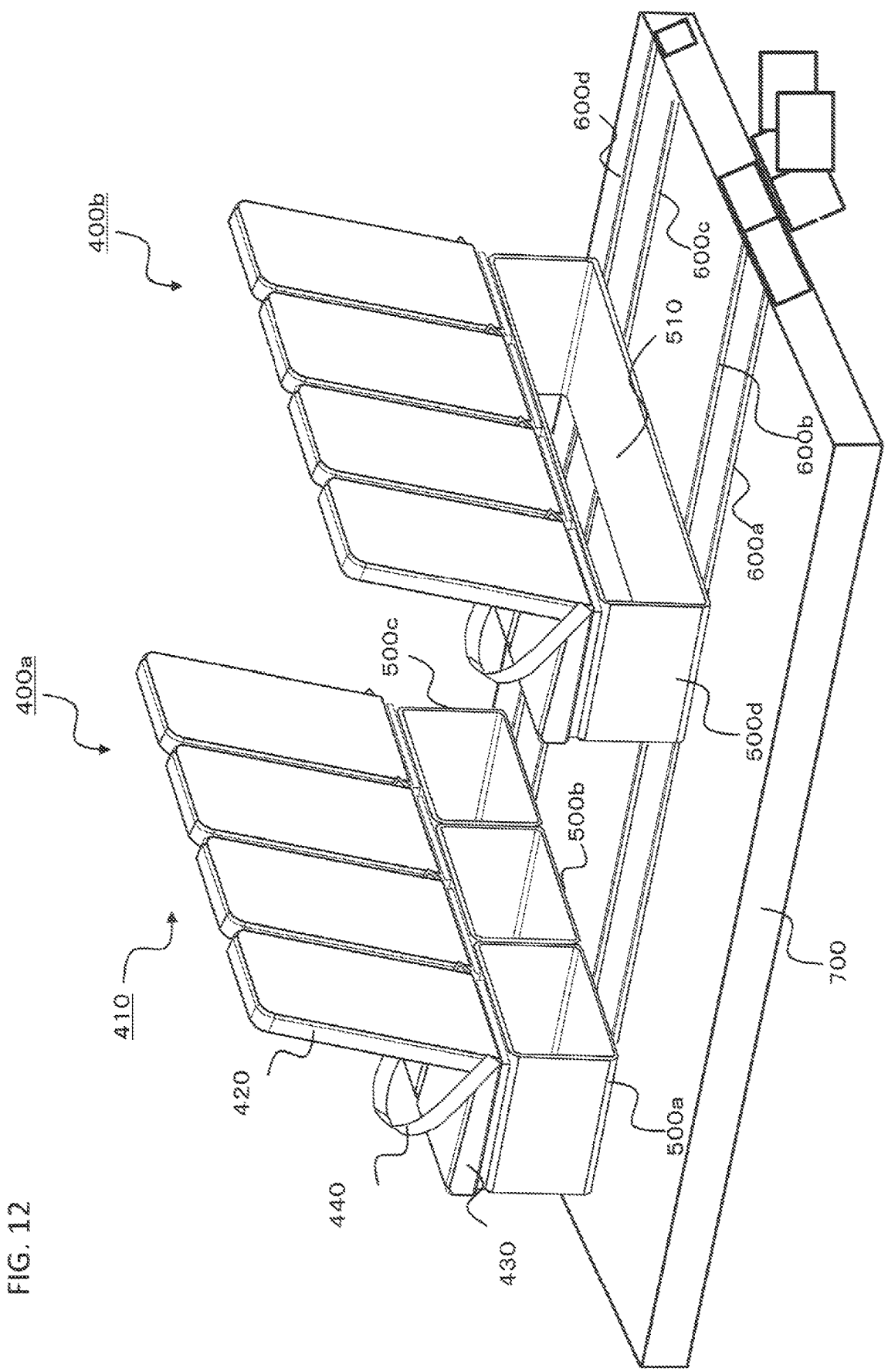
FIG. 12 is a rear perspective view of a seat unit according to a third embodiment.

FIG. 12 is a perspective view of the seat unit according to the third embodiment as viewed obliquely from the rear. The seat unit 400 may be used for the economy class disposed in the cabin of the aircraft.

(Configuration)

The seat unit 400 includes a seat 410 and a seat base 500. The seat 410 includes an upper seat 420, a lower seat 430, and a seat belt 440. The seat base 500 is an integrally molded hollow box-type seat lower structure as in the first embodiment.

The seat unit 400a includes a four person seat 410 and three seat bases 500a, 500b, and 500c. That is, the hollow region 510 is divided into three parts.

In contrast, the seat unit 400b includes a four person seat 410 and one seat base 500. That is, the hollow region 510 has one part.

Conventionally, the support structure that supports the leg of one seat is attached to at least two seat tracks attached to the floor 700 of the aircraft. That is, in the case of a 4 person seat, it is necessary to fix it to between 2 and 5 seat tracks. However, in the case of the seat unit 400a, despite being a four person seat, the seat base 500a is fixed with the two seat tracks 600a and 600b, the seat base 500c is fixed with the two seat tracks 600c and 600d, and the central seat base 500b need not be fixed to a seat track provided that it is adhered to the seat bases 500a and 500c on both sides.

Here, the manner in which the seat bases 500a and 500c are fixed to the seat tracks is, as described in FIG. 9, such that the seat base is fixed at two locations in front of and behind one seat track of the pair of seat tracks, and may be fixed to the other seat track at one location.

Accordingly, in the case of the seat unit 400a, there is no need to fix the central seat base 500b to the seat tracks 600a to 600d, which differs considerably from the conventional method in which the support structure supporting the leg of one seat is attached to two seat tracks.

In the case of the seat unit 400*b*, the greatest strength can be obtained by selecting 600*a* and 600*d* on the outermost side as the pair of seat tracks, but the present invention is not limited thereto. The manner in which the seat base 500*d* is fixed to the seat tracks is, as described in FIG. 9, such that the seat base is fixed at two locations in front of and behind one seat track of the pair of seat tracks, and may be fixed to the other seat track at one location.

In addition, the hollow region 510 of the seat unit 400*b* has a single hollow structure, and can be divided into four hollow regions using three partition members. Although the seat unit 400 has been described in the case of a four person seat as an example, the same seat base 500 can be applied in the case of two person seats and three person seats.

(Operational Advantage)

According to the third embodiment, the same advantages as those of the first embodiment can be obtained, and further, as there is no need to separate the space of the feet area for each passenger, this has the effect of increasing the space of the feet area.

In addition, since it is not necessary to provide a support structure for supporting the legs of the seat for each seat, this has the effect of increasing the degree of freedom of seat track selection. In addition, at the same time, it is possible to increase the degree of freedom of the arrangement of the seats themselves, and to increase the number of seats that can be arranged in the aircraft.

It should be noted that the present invention is not limited to the above-described embodiments, but also includes various modifications that can be applied to seats in fields other than aircraft. For example, the present invention can also be suitably used for other types of vehicles, such as trains, long-distance buses, and passenger ships, as well as water transport systems including ferries and hovercraft. In addition, the above-described embodiments are described in detail in order to explain the present invention in an easy-to-understand manner, and are not necessarily limited to include all of the described configurations. Also, a portion of the configuration of one embodiment can be replaced with the configuration of another embodiment, and the configuration of one embodiment can be added to the configuration of another embodiment. Further, it is possible to add, delete, or replace a portion of one configuration with a portion of the configuration of another embodiment.

REFERENCE SIGNS LIST

1, 400 Seat unit
10, 410 Seat
20 Shell
110, 430 Lower seat
120, 420 Upper seat
130 Headrest
140 Legrest
150, 440 Seatbelt
160 Upper seat support structure
170 Reinforcing member
180 Seat reclining mechanism
190 Foot reclining mechanism
210 Right side shell
220 Rear side shell
230 Left side shell
240, 500 Seat base
242, 510 Hollow region
244 Inner surface
246 Outer surface
247 Recess
248 Honeycomb structure
250 Partition member
260 Mounting block
262 First mounting block
264 Second mounting block
266 Third mounting block
270 Fixture
272 First fixture
274 Second fixture
276 Third fixture
280, 600 Seat track
282 First seat track
284 Second seat track
286 Underfloor structure
287 Flat portion
288 Seat track side fitting portion
290 Track fitting member
291 Fitting side fitting portion
292 Vertical spring
293 Plunger
294 Bolt
295 Nut
296 Lateral spring
297 Right side buffer member
298 Left side buffer member
310 Right armrest portion
320 Left armrest portion
330 Storage box
340 Ottoman
350 Jack
360 Reading light

The invention claimed is:

1. A lower structure of a seat unit comprising:
a hollow box structure integrally formed of a composite member for supporting a seat;
wherein the hollow box structure includes and is defined by a bottom surface for attaching the hollow box structure to a floor, at least two side wall surfaces extending in an upward direction from the bottom surface, and a top surface for supporting a seat,
wherein the top surface is substantially parallel to the bottom surface and is coupled to the at least two side wall surfaces,
wherein the lower structure includes brackets and fitting portions configured to attach the lower structure to seat rails in an aircraft at three attachment points on the bottom surface.

2. The lower structure of the seat unit according to claim 1, wherein the hollow box structure has an opening in a front direction of the lower structure of a seat unit.

3. The lower structure of the seat unit according to claim 2, wherein the opening of the hollow box structure has a quadrilateral shape.

4. The lower structure of the seat unit according to claim 1, wherein a partition plate is disposed in the hollow box structure to separate the hollow box structure into smaller sections.

5. The lower structure of the seat unit according to claim 1, wherein a block is embedded in the composite member at each of the attachment points, and one of the brackets is coupled to each block,
wherein a thickness of the composite member at an area where each bracket is coupled to each block is less than a thickness at an area of the composite member other than the area where each bracket is coupled to each block.

6. The lower structure of the seat unit according to claim 5, wherein a lower surface of the composite member at the area where each bracket is coupled to each block has a recess, and
an upper surface of the composite member at the area where each bracket is coupled to each block is flat.

7. A seat unit comprising:
a lower structure comprising a hollow box structure integrally formed of a composite member for supporting a seat; and
an upper shell formed above the lower structure,
wherein the hollow box structure includes and is defined by a bottom surface for attaching the hollow box structure to a floor, at least two side wall surfaces extending in an upward direction from the bottom surface, and a top surface for supporting a seat,
wherein the top surface is substantially parallel to the bottom surface and is coupled to the at least two side wall surfaces, and
wherein the lower structure includes brackets and fitting portions configured to attach the lower structure to seat rails in an aircraft at three attachment points on the bottom surface.

8. The seat unit according to claim 7, wherein:
the hollow box structure has an opening in a front direction of the seat unit;
the opening of the hollow box structure has a quadrilateral shape;
a partition plate is disposed in the hollow box structure to separate the hollow box structure into smaller sections;
the lower structure includes attachment points for attaching the lower structure to an aircraft at three places on the bottom surface;
a block is embedded in the composite member at each of the attachment points, and one of the brackets is coupled to each block,
wherein a thickness of the composite member at an area where each bracket is coupled to each block is less than a thickness at an area of the composite member other than the area where each bracket is coupled to each block; and
a lower surface of the composite member at the area where each bracket is coupled to each block has a recess, and
an upper surface of the composite member at the area where each bracket is coupled to each block is flat.

9. A seat unit comprising:
a lower structure comprising a hollow box structure integrally formed of a composite member; and
a multi-person seat unit disposed above and supported by the lower structure,
wherein the hollow box structure includes and is defined by a bottom surface for attaching the hollow box structure to a floor, at least two side wall surfaces extending in an upward direction from the bottom surface, and a top surface for supporting a seat,
wherein the top surface is substantially parallel to the bottom surface and is coupled to the at least two side wall surfaces, and
wherein the lower structure includes brackets and fitting portions configured to attach the lower structure to seat rails in an aircraft at three attachment points on the bottom surface.

10. The seat unit according to claim 9, wherein:
the hollow box structure has an opening in a front direction of the seat unit;
the opening of the hollow box structure has a quadrilateral shape;
a partition plate is disposed in the hollow box structure to separate the hollow box structure into smaller sections;
the lower structure includes attachment points for attaching the lower structure to an aircraft at three places on the bottom surface;
a block is embedded in the composite member at each of the attachment points, and one of the brackets is coupled to each block,
wherein a thickness of the composite member at an area where each bracket is coupled to each block is less than a thickness at an area of the composite member other than the area where each bracket is coupled to each block; and
a lower surface of the composite member at the area where each bracket is coupled to each block has a recess, and
an upper surface of the composite member at the area where each bracket is coupled to each block is flat.

* * * * *